Figure 1:
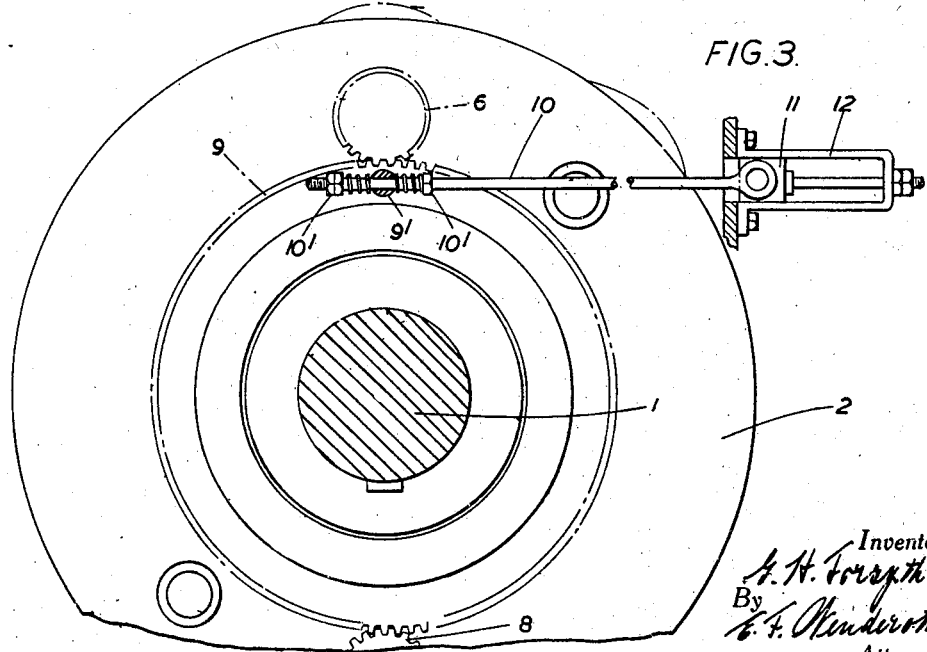

March 20, 1945.  G. H. FORSYTH  2,371,984
MEANS FOR IMPOSING HARMONIC TORQUES ON SHAFTING
Filed Feb. 2, 1943  2 Sheets-Sheet 1

Inventor
G. H. Forsyth
By
E. F. Wenderoth
Attorney

March 20, 1945. G. H. FORSYTH 2,371,984
MEANS FOR IMPOSING HARMONIC TORQUES ON SHAFTING
Filed Feb. 2, 1943 2 Sheets-Sheet 2

Inventor
G. H. Forsyth
By
E. F. Ohnsorth
Attorney

Patented Mar. 20, 1945

2,371,984

UNITED STATES PATENT OFFICE 2,371,984

MEANS FOR IMPOSING HARMONIC TORQUES ON SHAFTING

George Howard Forsyth, Stevenage, England

Application February 2, 1943, Serial No. 474,465
In Great Britain December 18, 1941

4 Claims. (Cl. 74—574)

This invention relates to a method of imposing harmonic torques on a shaft without a torque reaction being set up external to the said shaft. The harmonic torques may be imposed on a shafting system to prevent the stimulation of torsional vibration, which would otherwise arise from the torque excitation produced by the prime mover, or a consumer of power. Alternatively the invention may be used for exciting harmonic torques or vibrations on shafts for purposes other than the suppression of torsional vibration. One such method consists in providing in operational association with a disc or fly-wheel secured to the shafting system means for exerting on the said disc or fly-wheel periodic torques of such a character in order, magnitude, and phase, as to balance out or neutralise or eliminate the torsional vibrations which would otherwise develop. By the term "order" I mean the number of torque harmonics per revolution of the disc or fly-wheel. One embodiment of means of exerting the periodic torques on the said disc or fly-wheel consists of a weight mounted on the disc or fly-wheel and driven to perform circular motion about an axis eccentric to the disc or fly-wheel axis but parallel thereto so that as the disc or fly-wheel is rotated by the shaft on which it is mounted, the aforesaid weight rotates with it and also rotates about its own axis. A convenient way of making the weight describe a constant circular motion about its own axis while also rotating in company with the disc or fly-wheel is to secure it crankwise on a stub shaft to which is also keyed a pinion engaging in planet fashion with a normally stationary gear wheel mounted loosely on the shaft alongside the aforesaid disc or fly-wheel; the said weight is preferably employed in duplicate, the two being diametrically opposite on the disc or fly-wheel. Two or more pairs of such weights are provided, if desired, to deal with two or more torque harmonics as they tend to develop.

The chief object of the present invention is to improve the above described system of suppression of torque harmonics, particularly so that the periodic reactions on the stationary gear wheel on the main shaft are removed. Having removed the periodic reactions on the stationary gear wheel it is possible to give this wheel a resilient anchorage and thus remove or reduce gear loads between the pinions and wheel arising from small cyclic speed variation of the shaft of any order.

According to the present invention each weight acting eccentrically about the axis of the planetary pinion is coupled to a complementary weight in such a fashion that the unit produces harmonic tangential forces acting in the same direction but radial forces in the opposite direction, such radial forces being in turn balanced by a similar unit mounted on the disc or fly-wheel in the diametrically opposite position. For this purpose the first weight may conveniently be a pinion mounted axially on the stub-shaft of the planetary pinion but having an unsymmetrical weight distribution; the complementary weight may be similarly formed as an unsymmetrically balanced pinion, and the coupling of the two pinions may be a direct meshing of their teeth so that they rotate in opposite directions while they both travel round the main axis of the system. The out of balance weights are such that the tangential forces exerted by the pinions are in phase but the radial forces of the meshing pair are 180 degrees out of phase; however, the transverse forces on the disc or fly-wheel are balanced, as already mentioned, by the provision of a similar pair of meshed pinions mounted diametrically opposite on the disc or fly-wheel, which in turn impose radial forces so that a balanced harmonic torque is produced.

Any number of units for any harmonic order or orders may be mounted on the disc or fly-wheel to deal with any desired order or orders of vibration.

The magnitude of the out-of-balance force in each unit may be varied under dynamic conditions by a counter-weight acting radially outwards against a spring; in this way the relationship between the amplitude of the harmonic torque exerted on the disc or fly-wheel and the speed of rotation of the main shaft can be suitably adjusted.

Figure 2:
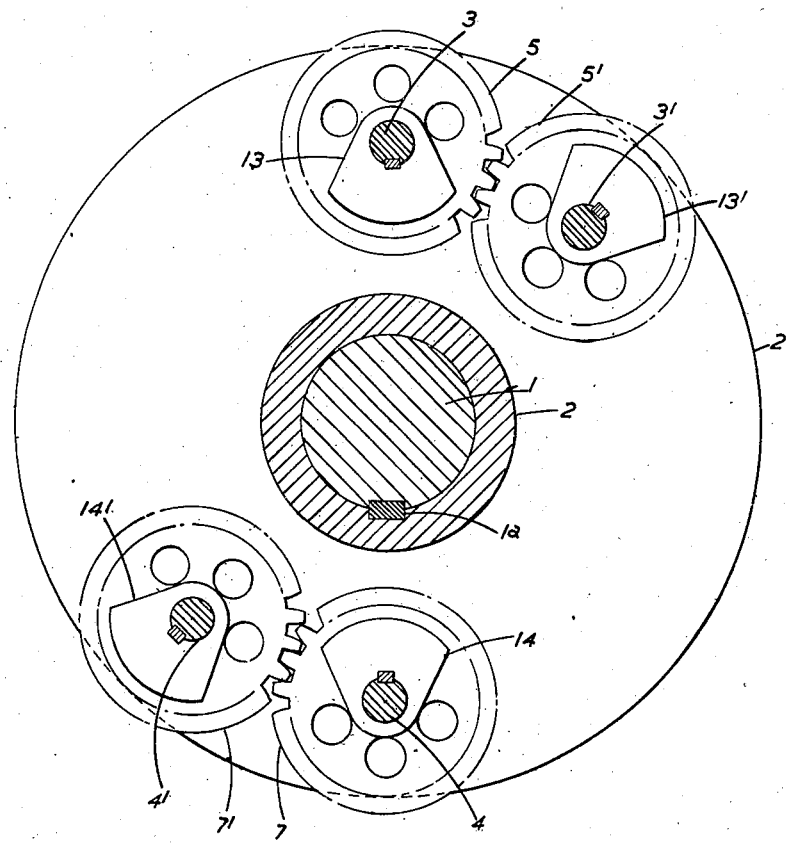

The invention will now be described more fully with reference to the accompanying drawings in which:

Figure 1 is an axial sectional elevation of one embodiment of the present invention, Figure 2 is a cross-sectional elevation as taken on the line 2—2 of Figure 1, Figure 3 is a fragmentary somewhat diagrammatic view taken in the direction of the arrows 3—3 on Figure 1.

I is the shaft in which it is to be supposed that torque harmonics occur due to its connection with a prime mover or consumer of power, not shown.

Secured to the shaft I as by a key $1^a$ is a flywheel or disc 2 of channel section carrying between its cheeks two pairs of stub shafts 3, 3' and 4, 4' respectively. On the stub shafts 3, 3' are keyed two pairs of intermeshing pinions 5, 5' located between the cheeks of the fly-wheel, and on the shaft 3 is also keyed a pinion 6 external to the fly-wheel. Similarly on the stub shafts 4, 4' are keyed two pairs of intermeshing pinions 7, 7' located between the cheeks of the fly-wheel and on the shaft 4 is also keyed a pinion 8 external to the fly-wheel.

Mounted on a bearing 2a on the fly-wheel 2 is a gear wheel 9 concentric with the power shaft 1 and the fly-wheel. This gear wheel is held stationary by a rod 10 carrying at one end thereof two nuts 10' engaging through two coil springs a pin 9' on the gear wheel; the other end of the rod 10 is connected to a slide block 11 in a stationary frame 12. Pinions 6 and 8 are in mesh with gear wheel 9.

The pinion 5 has secured to it or formed integrally with it a weight 13 in an eccentric position, and the pinion 5' has secured to it or formed integrally with it a weight 13' in an eccentric position. The weights 13, 13' are complementary so that the unit constituted by the pinions 5, 5' and their weights 13, 13' produces when rotated harmonic tangential forces acting in the same direction but radial forces in opposite directions.

Similarly the pinions 7, 7' have complementary weights 14, 14', and constitute a second unit.

As will be seen from the drawings the respective orientations of the eccentric weights 13, 13', 14, 14' is such that when the two weights 13, 14 are both in their innermost radial position and are diametrically in line with one another, the weights 13', 14' are both in their outermost radial position and are diametrically in line with one another.

The two units above described have their eccentric weights preselected to suppress one particular harmonic order of vibrations known to arise in the power shaft. Similar pairs of units may be provided on the same fly-wheel or on different fly-wheels to suppress other orders of harmonic vibrations.

It will be understood that when the power shaft 1 rotates it carries with it the fly-wheel 2 and that as the gear wheel 9 is held stationary the pinions 6 and 8 are carried round with the fly-wheel and are also rotated about their own axes. Rotation of the pinions 6 and 8 and of their stub shafts forcibly imparts rotation to the pairs of pinions 5, 5' and 7, 7' respectively. While the pairs of pinions are rotating, the tangential forces exerted by each pair are in phase but the radial forces of the same pair are 180 degrees out of phase. The fact that each unit or pair of pinions has its counterpart by a similar unit or pair of pinions in the diametrically opposite position on the fly-wheel ensures that a balanced harmonic torque is produced.

Adjustment of the slide block 11 serves to adjust the phase relation as it causes a slight angular adjustment of the stationary gear wheel 9.

What I claim is:

1. Means for imposing a torque harmonic on a power shaft, comprising a fly-wheel secured to the shaft, a plurality of units symmetrically arranged on said fly-wheel with respect to the shaft axis, each unit comprising (a) a pair of weights mounted on the said fly-wheel for rotation in opposite directions eccentrically about respective axes, said last-named axes being themselves eccentric with respect to the said shaft axis, and (b) a pair of intermeshing pinions operatively connected to said pair of weights and being oriented with respect to each other and to the said shaft axis so that the tangential forces exerted by the weights respectively connected thereto are in phase while the radial forces are 180 degrees out of phase, whereby there are produced harmonic forces acting in the same sense tangentially about said shaft axis and forces acting in the opposite sense radially with respect to the said shaft, and means for driving the pinions as they are carried around with the fly-wheel when the shaft rotates.

2. Means for imposing a torque harmonic on a power shaft, comprising a fly-wheel secured to the shaft, a plurality of units symmetrically arranged on said fly-wheel with respect to the shaft axis, each unit comprising (a) a pair of weights mounted on the said fly-wheel for rotation in opposite directions eccentrically about respective axes, said last-named axes being themselves eccentric with respect to the said shaft axis, and (b) a pair of intermeshing pinions operatively connected to said pair of weights and being oriented with respect to each other and to the said shaft axis so that the tangential forces exerted by the weights respectively connected thereto are in phase while the radial forces are 180 degrees out of phase, whereby there are produced harmonic forces acting in the same sense tangentially about said shaft axis and forces acting in the opposite sense radially with respect to the said shaft, a normally stationary gear wheel disposed concentrically with respect to said shaft, and a driving pinion operatively connected to one of the pinions of each of the pairs of meshing pinions, said driving pinion being in mesh with the said gear wheel.

3. Means for imposing a torque harmonic on a power shaft, comprising a fly-wheel secured to the shaft, a plurality of units symmetrically arranged on said fly-wheel with respect to the shaft axis, each unit comprising (a) a pair of weights mounted on the said fly-wheel for rotation in opposite directions eccentrically about respective axes, said last-named axes being themselves eccentric with respect to the said shaft axis, and (b) a pair of intermeshing pinions operatively connected to said pair of weights and being oriented with respect to each other and to the said shaft axis so that the tangential forces exerted by the weights respectively connected thereto are in phase while the radial forces are 180 degrees out of phase, whereby there are produced harmonic forces acting in the same sense tangentially about said shaft axis and forces acting in the opposite sense radially with respect to the said shaft, a normally stationary gear wheel disposed concentrically with respect to said shaft, means operatively connecting said pinions and said gear wheel, and means for angularly adjusting the stationary gear wheel to any desired position.

4. Means for imposing a torque harmonic on a power shaft, comprising a fly-wheel secured to the shaft, a plurality of units symmetrically arranged on said fly-wheel with respect to the shaft axis, each unit comprising (a) a pair of weights mounted on the said fly-wheel for rotation in opposite directions eccentrically about respective axes, said last-named axes being themselves eccentric with respect to the said shaft axis, and (b) a pair of intermeshing pinions operatively connected to said pair of weights and being oriented with respect to each other and to the said shaft axis so that the tangential forces exerted by the weights respectively connected thereto are in phase while the radial forces are 180 degrees out of phase, whereby there are produced harmonic forces acting in the same sense tangentially about said shaft axis and forces action in the opposite sense radially with respect to the said shaft, a normally stationary gear wheel disposed concentrically with respect to said shaft, a driving pinion operatively connected to one of the pinions of each of the pairs of meshing pinions, said driving pinion being in mesh with the said gear wheel, means for angularly adjusting the stationary gear to any desired position, and means for adjusting the relationship between the amplitude of the harmonic torque exerted on the fly-wheel and the speed of rotation of the shaft.

GEORGE HOWARD FORSYTH.